United States Patent
Liu

(10) Patent No.: US 7,248,590 B1
(45) Date of Patent: Jul. 24, 2007

(54) METHODS AND APPARATUS FOR TRANSMITTING VIDEO STREAMS ON A PACKET NETWORK

(75) Inventor: Xiaomei Liu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1074 days.

(21) Appl. No.: 10/369,815

(22) Filed: Feb. 18, 2003

(51) Int. Cl.
*H04L 12/28* (2006.01)
*H04J 3/16* (2006.01)
*H04J 3/24* (2006.01)
*H04J 3/04* (2006.01)

(52) U.S. Cl. ............... 370/395.64; 370/466; 370/474; 370/535

(58) Field of Classification Search .................. None
See application file for complete search history.

(56) References Cited

U.S. PATENT DOCUMENTS

| | | | |
|---|---|---|---|
| 6,292,490 B1* | 9/2001 | Gratacap et al. | 370/412 |
| 6,831,892 B2* | 12/2004 | Robinett et al. | 370/232 |
| 6,928,656 B1* | 8/2005 | Addington | 725/111 |
| 6,940,873 B2* | 9/2005 | Boyle et al. | 370/503 |
| 7,035,295 B2* | 4/2006 | Belleguie | 370/537 |
| 7,065,288 B1* | 6/2006 | Xue | 386/52 |

OTHER PUBLICATIONS

H. Schulzrinne et al., "RFC 1889—RTP: A Transport Protocol for Real-Time Applications", Jan. 1996, hhtp://www.faqs.org/rfcs/rfc1889.html, pp. 1-54.
Hoffman et al., "RTP Payload Format for MPEG1/MPEG2 Video", Jan. 1998, Standards Track, pp. 1-16.

* cited by examiner

*Primary Examiner*—Chi Pham
*Assistant Examiner*—Melanie Jagannathan
(74) *Attorney, Agent, or Firm*—Beyer Weaver LLP

(57) ABSTRACT

Methods and apparatus are provided for converting video packets into IP packets. Video packets including null packets associated with timing information are received at a network entity coupling a video network to an IP network. Video packets are selectively combined into IP packets to allow transmission of video data onto the IP network in an efficient and effective manner. Null packets used to maintain timing information in the video network are removed. Mechanisms are provided for maintaining timing information even without transmitting extraneous packets.

29 Claims, 8 Drawing Sheets

METHODS AND APPARATUS FOR TRANSMITTING VIDEO STREAMS ON A PACKET NETWORK

BACKGROUND OF THE INVENTION

1. Field of Invention

The present invention relates to converting data. More specifically, the present invention relates to methods and apparatus for efficiently and effectively converting video data between a video network and an Internet Protocol network.

2. Description of the Related Art

Conventional mechanisms for converting between video packets and IP packets are limited. Video data in a video network is typically transmitted in a format that is based on the characteristics of the particular video network. IP packets are typically transmitted in a format based on the characteristics of the IP network. When data reaches a network entity bridging the two types of networks, format conversion is often performed in order to allow entities on the two different networks to communicate.

However, because of the different characteristics of the two types of networks, simple conversion often does not allow efficient and effective transmission of video data on IP networks. Simple conversion often assumes that the characteristics of the two networks are the same. Consequently, it is desirable to provide improved techniques for converting data, particularly video data, for transmission over a network such as an IP network.

SUMMARY OF THE INVENTION

Methods and apparatus are provided for converting video packets into IP packets. Video packets including null packets associated with timing information are received at a network entity coupling a video network to an IP network. Video packets are selectively combined into IP packets to allow transmission of video data onto the IP network in an efficient and effective manner. Null packets used to maintain timing information in the video network are removed. Mechanisms are provided for maintaining timing information even without transmitting extraneous packets.

In one embodiment, a method for converting video packets into internet protocol (IP) packets is provided. A plurality of video packets are received. The plurality of video packets are associated with a video transport reference time stamp. The video transport reference time stamp provides timing information relative to a video source clock. The plurality of video packets are filtered to select a subset of the video packets. The subset of video packets are combined into an IP packet having an IP reference time stamp corresponding to the video transport reference time stamp. Offset information for multiple video packets in the subset of video packets is determined. The offset information is incorporated into the IP packet.

In another embodiment, a gateway coupling a video network to an IP network is provided. The gateway includes a video network interface, a processor, and an IP network interface. The video network interface is configured to receive video packets. The video packets are associated with a video transport reference time stamp. The video transport reference time stamp provides timing information relative to a video source clock associated with the sender of the video packets. The processor is configured to filter the video packets to select a subset of the video packets and combine the subset of video packets into an IP packet having an IP reference time stamp corresponding to the video transport reference time stamp. The processor is further configured to determine offset information for multiple video packets in the subset of video packets. The IP network interface is configured to transmit the IP packet along with the offset information onto the IP network.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of video packets such as MPEG transport packets converted into packets for transmission on an Internet Protocol (IP) network. However, it should be noted that the techniques of the present invention are applicable to a variety of different protocols and networks. Further, the solutions afforded by the invention are equally applicable to audio coding systems. According to various embodiments, the techniques of the present invention allow for the conversion of delay sensitive video signals from a video network onto an IP network for transmission with high efficiency and accurate clocking.

Figure 1:
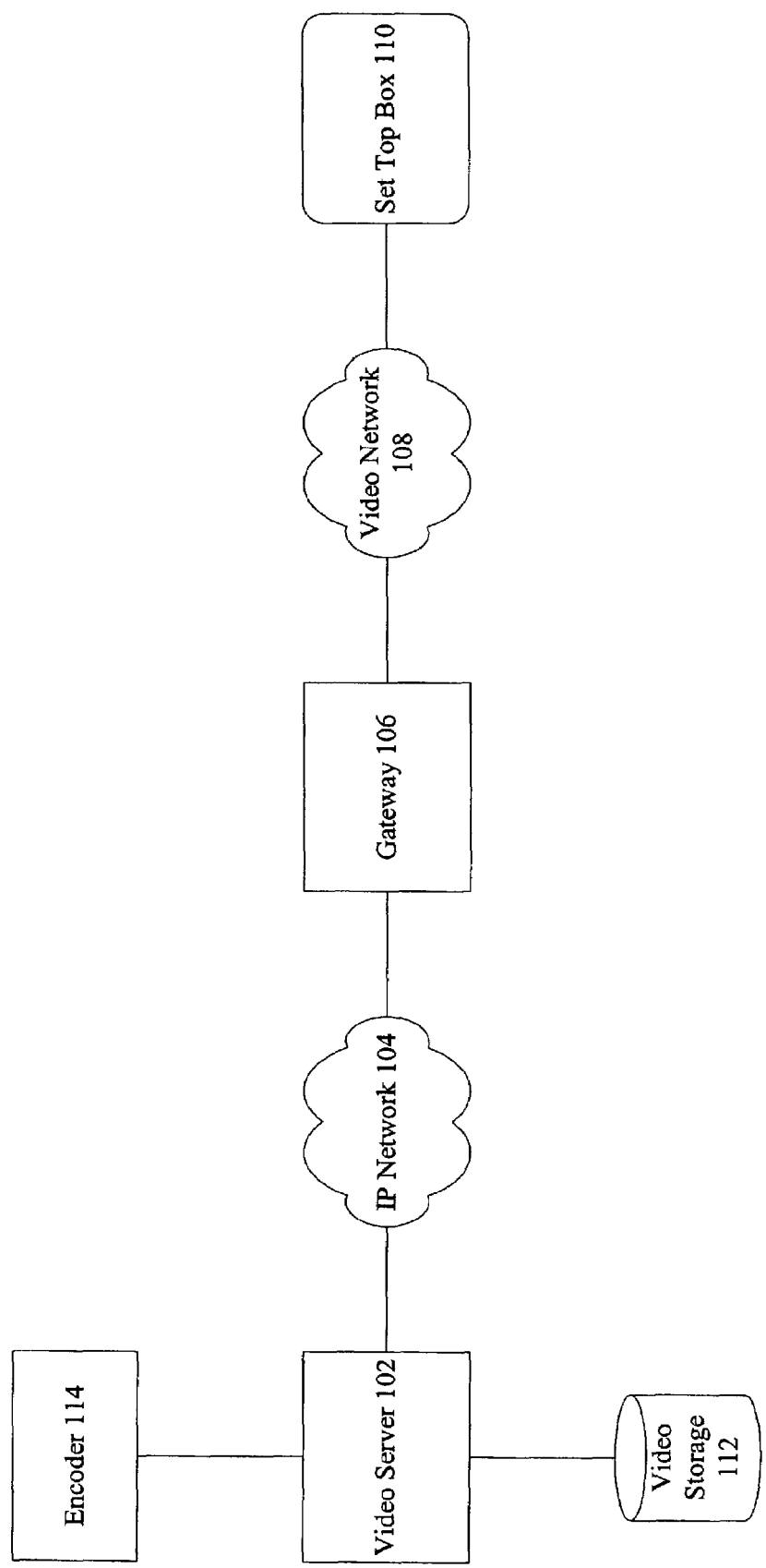
FIG. 1 is a diagrammatic representation of a system that can use the techniques of the present invention.

FIG. 1 is a diagrammatic representation showing a system that can use techniques of the present invention. In one example, a video server 102 is coupled to devices such as video storage 112 or an encoder 114. The video server 102 provides a source of video data on the IP network 104. The IP network couples gateway 106 to the video server 102. It should be noted gateway 106 may be a device such as a router, switch, or a cable modem network headend. The gateway 106 allows communication between entities on two different types of networks, such as IP network 104 and video network 108. In one example, the video network 108 is a Hybrid Fibre Coaxial Cable (HFC) network including multiple of set top boxes and decoders such as set top box/decoder 110.

HFC is a network in which optical fiber cable and coaxial cable comprise different portions of the network. By way of example, an HFC system may use fiber optic cable from video gateway 106 to a plurality of serving nodes (not shown) located near set top boxes/decoders 110 and then use coaxial cable from the serving nodes to connect with set top boxes/decoders 110. An advantage of HFC is that the high bandwidth of fiber optic cable may be provided to a user without having to replace all existing coaxial cable.

Gateway 106 also provides remultiplexing, conversion, or transcoding of the video input from IP network 104, which is typically in the MPEG-2 transport format. In typical video networks, time stamps are inserted into MPEG-2 transport packets during the encoding process or the multiplexing process. Video networks are generally built with a constant bit rate (CBR) model and assume constant delay across the network. A constant delay model allows a decoder/receiver to exactly follow the original encoder source clock. An encoder/sender clock associated with time stamp information in video transport packets is referred to herein as a source clock.

MPEG-2 refers to a portion of the standards for high quality video transmission developed by the Motion Pictures Expert Group (MPEG). The set of MPEG standards is catalogued by the International Standards Organization (ISO) as ISO 13818. Although a system will typically make use of MPEG-2, It is not the intent of the inventors to restrict the present invention to MPEG-2. Hereinafter we will use the generic term MPEG in the disclosure, figures and claims to encompass all forms of MPEG transmission. Further, it is not the intent of the inventors to restrict the present invention to the use of MPEG only transmissions but to encompass any other streaming media transmission protocol that may utilize the techniques of the present invention. A variety of international standards have been created on video compression schemes. Some standards include MPEG-1, MPEG-2, MPEG-4, H.261, H.262, H.263, H.263+, etc.

Figure 2:
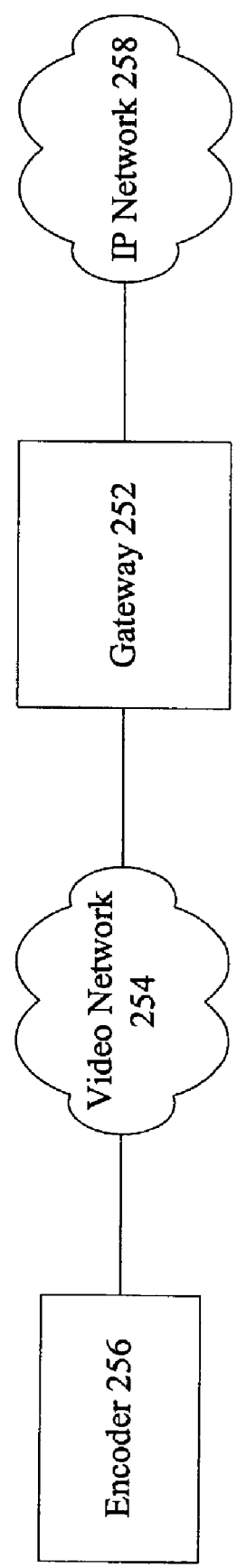
FIG. 2 is a diagrammatic representation of another system that can use the techniques of the present invention.

FIG. 2 is a diagrammatic representation of another system that can use the techniques of the present invention. An encoder 256 may be acquiring actual video data and converting into video packets representing portions of video frames for transmission onto a video network 254. When a gateway receives the video packets from the video network 254, the gateway 252 performs various operations to allow the transmission of the video packets onto IP network 258.

In typical video transport networks, video packets (video transport packets) are transmitted along with null packets in order to preserve the playback timing of the transmitted video packets. In one example, a sequence of ten video packets may be followed by a sequence of five null packets and subsequently another sequence of two video packets in order to allow play back of the video transmission in a smooth and continuous manner, while avoiding buffer underflow or overflow at a receiver.

Providing a large number of null packets in a relatively high bandwidth network such as a video network is typically acceptable. When the video packets are converted for transmission onto an IP network, where bandwidth resources may be more limited, null packets are nonetheless typically maintained in order to preserve timing information. Having a large number of null packets being transmitted onto a network with more limited bandwidth leads to inefficient transmission of video data on the IP network. More video channels could be transmitted if the null packets were replaced with video data. However, simply replacing null packets with video packets would eliminate timing information maintained by the null packets. The techniques of the present invention provide methods and apparatus for reducing or eliminating the transmission of null packets on the IP network used to maintain timing information. Mechanisms are provided for removing null packets while still maintaining clocking information to allow play back of the video transmission in a smooth and continuous manner.

Figure 3:
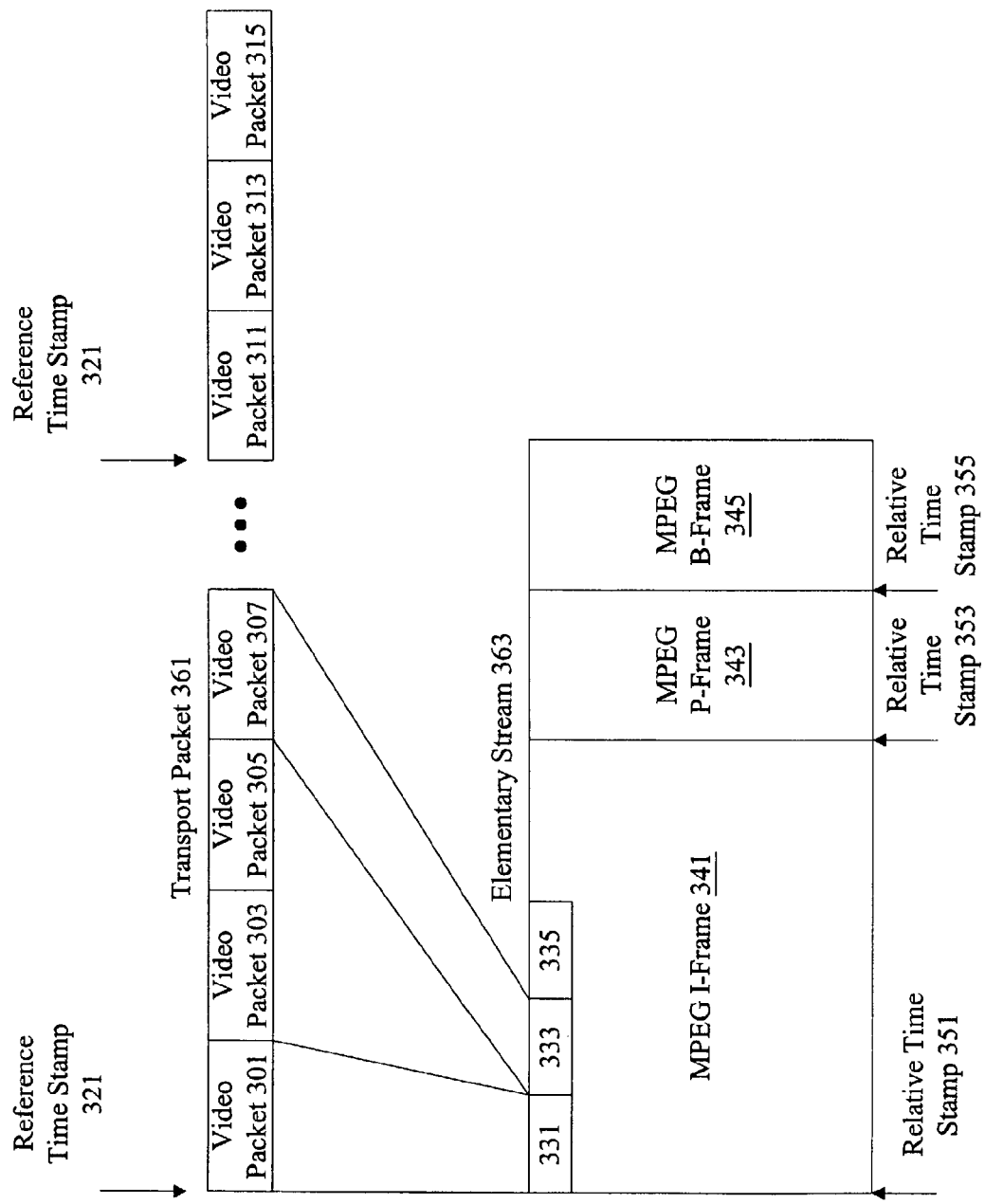
FIG. 3 is a diagrammatic representation showing MPEG video frames and associated MPEG video transport packets.

FIG. 3 is a diagrammatic representation showing one example of MPEG video frames. A variety of mechanisms can be used for encoding video. MPEG provides mechanisms whereby I-frames, B-frames, and P-frames in an elementary video stream 363 are used to represent video data as well as represent differences between video frames. In some examples, reference frames such as an I-frame 341 is a base frame from which other frames such as P-frame 343 and B-frame 345 are based. Each frame can have relative time stamps such as presentation time stamps (PTS) or decoding time stamps (DTS) which use a program clock reference (PCR) as a reference time stamp.

Using information about I-frame 341, other frames can be reconstructed based on differences recorded in frames such as P-frame 343 and B-frame 345. P-frame 343 and B-frame 345 can also be displayed at the correct time using a relative time stamps 351, 353, and 355. To transport the video frames, the video frames are divided into video transport packets such as video packet 301, 303, 305, 307, etc in a transport packet 361. According to various embodiments, the video data in an MPEG transport stream is composed of time-multiplexed packets from different video programs. Video packets such as MPEG video transport packet 301, 303, 305, 307, 311, 313, and 315 have a 4 byte header and a 184 byte payload. The small packet length is suited for relatively high error mediums as the errors thus affect less data. However, a small packet length increases the overhead caused by the headers of the video packets. In many examples, the header includes a byte used for random access to the stream, a Program ID (PID) used for the identification of all packets belonging to the same data stream or video program, and a continuity counter field which may be viewed as a sequence number, as it can be incremented by one for each packet having the same PID.

In typical implementations, several video packets such as video packet 301 and video packet 311 include reference time stamps 321 and 323. In one example, reference time stamps 321 and 323 are used as tickers to allow timing information for a received transmission to be recovered. A reference time stamp 323 may indicate that a video packet 311 should be transmitted or received 22 clock cycles after a reference time stamp 321. In MPEG-2 video transport packets, timing information is included in an optional adaptation field used to convey a program clock reference (PCR) to support synchronization of the playback at the receiving end. In one example, the transport stream is clocked at 27 MHz. The video packets 303, 305, 307, 313, and 315 that do not have reference time stamp information have the information derived based on their position following a packet with a reference time stamp. For example, a video packet 313 may be run 100 clock cycles after video packet 311. A video packet 315 may be run 200 clock cycles after video packet 311. A video packet 307 may be run 300 clock cycles after a video packet 301.

Because the position of the video packet without a time stamp is derived from its position and a reference time stamp, filler packets such as null packets may be transmitted simply to maintain timing information for a particular video packet. In one instance, video packets 303 and 305 may not include any video information. Nonetheless, the null packets 303 and 305 are transmitted anyway in order to act as placeholders.

Any high bandwidth network having null video packets transmitted in order to maintain timing information for non-null video packets in relation to a video packet with timing information is referred to herein as a video network. In one example, the video network is an HFC network. Any packet having video frame data along with a video program identifier is referred to herein as a video packet.

When video packets arrive at a gateway from a video network, the video packets are converted into a format appropriate for transmission onto an IP network. In typical cases, it would be highly inefficient to transmit small packets such as MPEG transport packets on an IP network, as the overhead would be significant. Consequently, multiple video packets are usually combined into a single IP packet for transmission. In one example, the single packet is a Real-Time Transport Protocol (RTP) packet. RTP is used in the transport of real-time data such as audio or video packets on an IP network. It does provide time stamps that aid the receiver to find the sending time of a packet. RTP is used to send data in one direction with no acknowledgement. The header of each RTP packet contains a time stamp so the recipient can reconstruct the timing of the original data, as well as a sequence number, which lets the recipient deal with missing, duplicate or out-of-order packets. The Internet Engineering Task Force (IETF) describes RTP in RFC 1889. The International Telecommunication Union employs RTP in the multimedia communications standard H.323

RTP is also described in RFC 2250. In particular, RFC 2250 describes a packetization scheme for MPEG video and audio streams. The scheme can be used to transport such as a video or audio flow over the transport protocols supported by RTP. Several approaches can be used. The first approach is designed to support maximum interoperability with MPEG System environments. The second approach is designed to provide maximum compatibility with other RTP-encapsulated media streams and future conference control work of the IETF.

Figure 4:
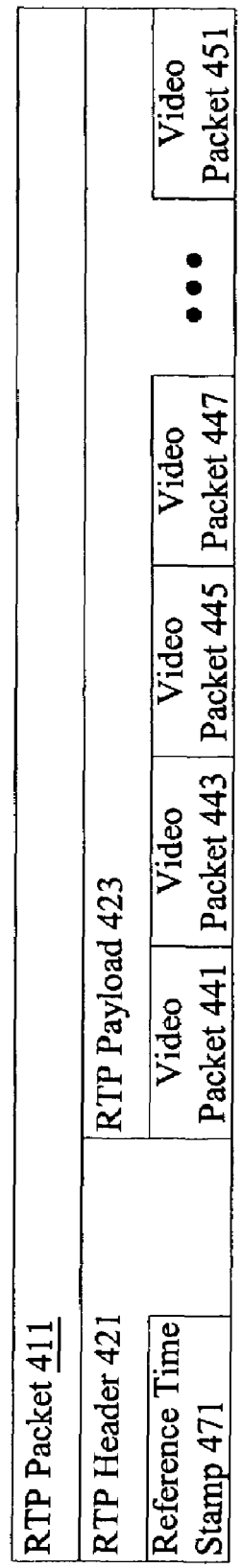
FIG. 4 is a diagrammatic representation showing an IP packet including multiple MPEG video transport packets.

FIG. 4 is a diagrammatic representation showing an example of an RTP video packet. An RTP packet 411 typically includes about six MPEG packets 441, 443, 445, 447, 449, and 451. In this example, the gateway provides a reference time stamp 471 for each RTP Packet 411 transmitted onto the IP network. In some instances, the reference time stamp of the RTP packet is synchronized to the PCR time stamp. At gateway 106, a receiving time stamp will be recorded for every MPEG packet. The individual video packets in the RTP payload 423 do not have any timing information in themselves, but timing information for the video packets can be derived based on the reference time stamp 471, the position of the video packet in the payload 423, and the time stamp of the next RTP packet assuming constant bitrate between two RTP packets. Consequently, it is again important to preserve the position of video packets. In one example, a video packet 447 is the fourth packet after a reference time stamp 471. A video packet 449 is the fifth packet after a reference time stamp 471. In order to maintain timing information for the various video packets, filler packets or null packets are provided. In one instance, only packets 441 and 451 in RTP payload 423 may contain video data. Nonetheless, null video packets 443, 445, 447, and 449 need to be transmitted in order to maintain the position and consequently the timing information of video packet 451.

Figure 5:
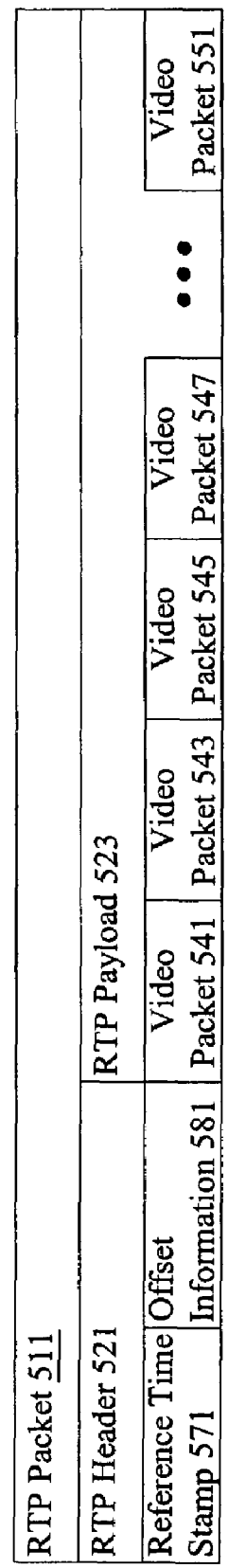
FIG. 5 is a diagrammatic representation showing an IP packet including multiple MPEG video transport packets.

FIG. 5 is a diagrammatic representation showing an RTP packet according to various embodiments of the present invention. An RTP packet 511 maintains a reference time stamp 571 in an RTP header 521 and video packets in the RTP payload 523. In one example, an identifier is included in the header to distinguish between types of payload such as MPEG1 System Streams, MPEG2 Program Streams and MPEG2. According to various embodiments, the RTP packet timestamp is a 32 bit 27 MHz timestamp representing the target transmission time for the first byte of the packet.

However, the video packets in RTP payload 523 hold only video data. Null or filler packets are not needed as placeholders. Instead, the techniques of the present invention contemplate providing offset information 581. In one example, an offset is associated with each of the video packets 541, 543, 545, 547, 549, and 551. For example, an offset of 100 cycles is associated with video packet 541, an offset of 300 cycles is associated with video packet 543, and an offset of 1100 cycles is associated with video packet 545. Offset information 581 may be maintained as clock cycles, time indices, etc. In one example, offset information 581 is included in the RTP header 521. However, offset information 581 may be provided in the payload or as an entirely separate packet.

The mechanisms of the present invention recognize that maintaining null packets in a bandwidth limited network such as an IP network is wasteful. By using the techniques of the present invention, there is no assumption of having a constant bit rate (CBR) stream. For example, most video streams are variable bit rate (VBR), e.g. 2 Mbps-4 Mbps. If CBR has to be used under conventional techniques, 4 Mbps of bandwidth has to be reserved. By using the techniques of the present invention, bandwidth need not be overprovisioned. As an IP network is generally a variable bit rate network, the techniques of the present invention make better use of the bandwidth of the IP network. The techniques of the present invention recognize that the cost of increased packet overhead and packet processing indeed outweigh the cost of transmitting filler or null packets due to particular characteristics of the transmitted data. Consequently, null packets and filler packets are removed, and instead offset information is introduced to maintain timing information associated with the various video packets. The techniques of the present invention are particularly applicable to the transmission of video packets on an IP network. Many video streams are variable bit rate streams because VBR allows higher quality encoding of video data than CBR encoding.

Figure 6:
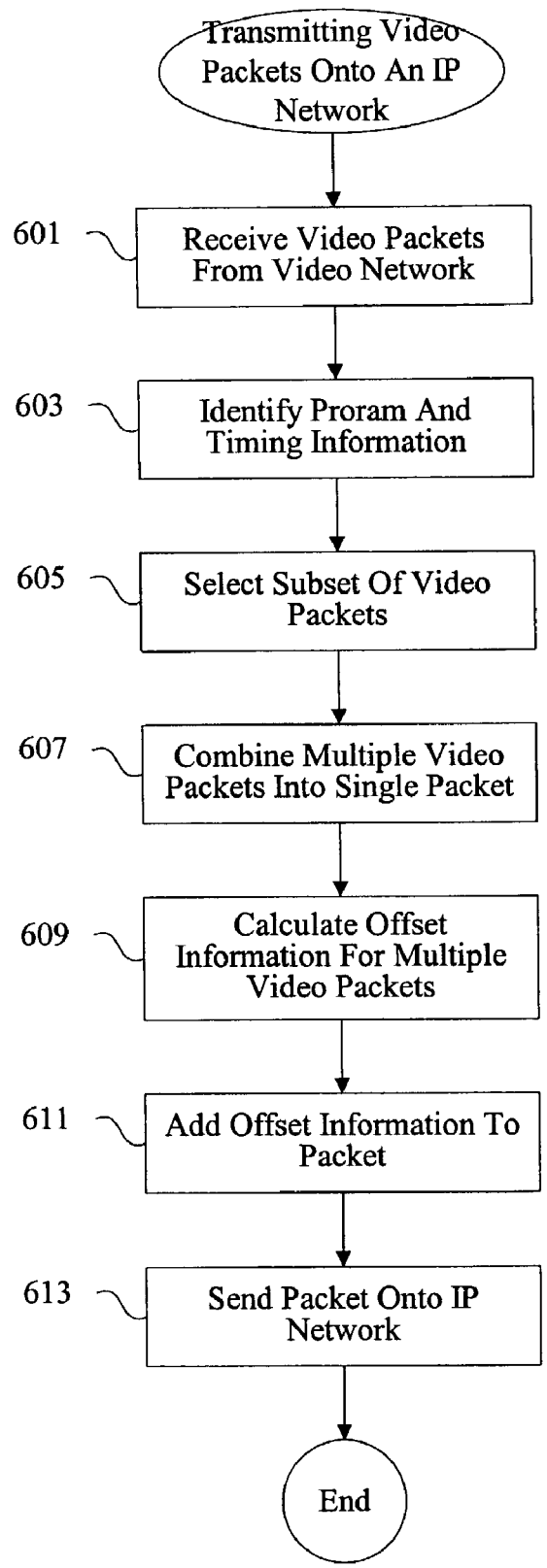
FIG. 6 is a process flow diagram showing conversion of video packets into IP packets.

FIG. 6 is a flow process diagram showing a technique for converting video packets into IP packets. At 601, video packets are received from a video network. In one example, the video packets are MPEG-2 transport packets. At 603, program and timing information for each of the various video packets is identified. In many instances, timing information is determined based on the position of a video packet without a reference time stamp in a sequence of video packets. For example, a first packet may contain PCR information while 50 subsequent packets may not contain any PCR information. Nonetheless, timing information can be determined based on the position of a particular packets relative to a packet with PCR information. Null packets are typically included in order to maintain positions of the various video packets. Program information is also extracted. The video packets received may be associated with a number of different video programs. In typical instances, a video program identifier is read in order to sort the packets into appropriate streams. At 605, a subset of video packets is selected. The subset is selected to exclude null packets as well as packets that do not belong to a particular program.

At 607, multiple video packets of the subset are combined into a single IP packet. In some cases, the single packet is an RTP packet having a particular destination. Offset information for the multiple video packets in the RTP packet is calculated at 609. In one example, offset information is a counter indicating the number of clock cycles a particular video packet encapsulated in an RTP packet should follow a reference time stamp included in the header of a packet. The offset information allows the elimination of null packets needed to maintain timing information. In another example, offset information may be the number of video or null packets that would have been included between the various video packets in the RTP packet. A wide variety of mechanisms can be used to convey offset information. At 611, offset information is added to the packet. In one example, offset information is included in an optional field in the header. In another example, offset information can be included in each video packet itself. At 613, the packet is transmitted onto the IP network.

Although the techniques shown herein have a particular identified order, it should be noted that a variety of processes can be performed in many different orders. For example, the calculation of offset information can be performed as soon as video packets are received. Similarly, offset information can be added to a packet as soon as video packets are combined into a single IP packet. Furthermore, the techniques of the present invention can be used in a variety of network entities, not simply an entity that bridges a video network to an IP network. The techniques of the present invention are applicable anywhere conversion between packet types occur.

Figure 7:
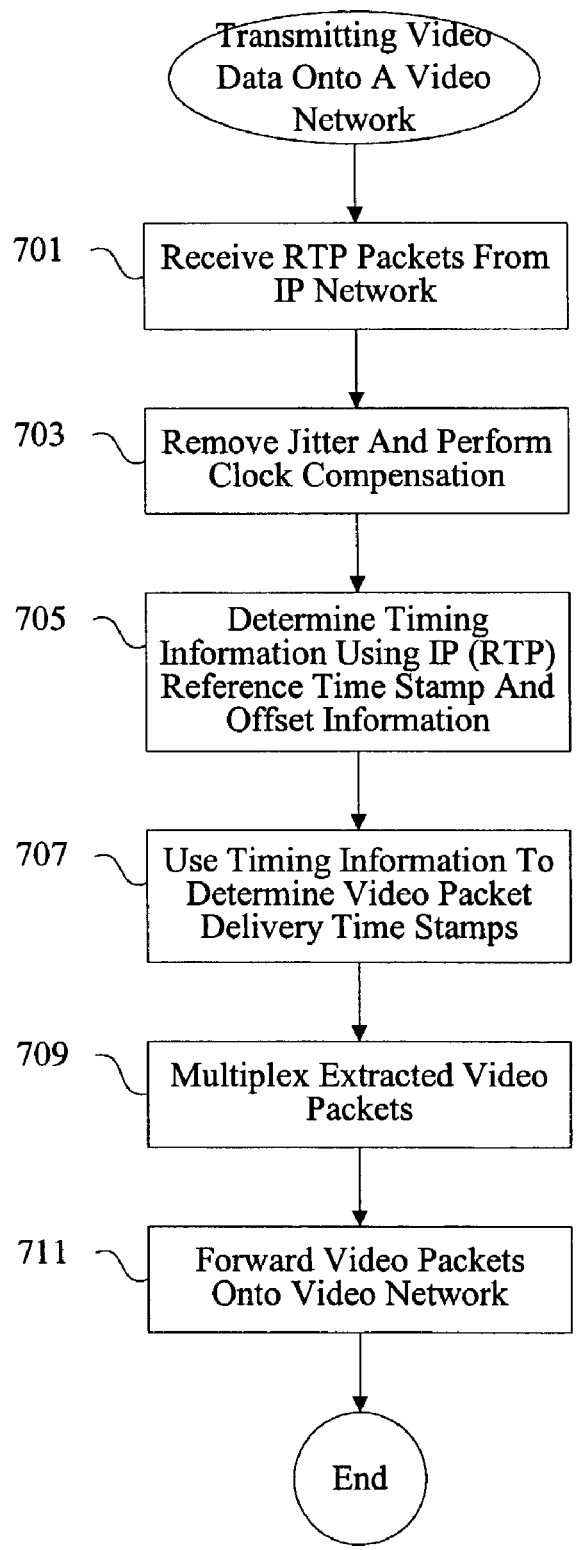
FIG. 7 is a process flow diagram showing conversion of IP packets into video packets.

FIG. 7 is a flow process diagram showing a technique for converting IP packets into video packets. At 701, RTP packets are received from an IP network. At 703, jitter is removed by digital filtering technology and clock recovery. Clock compensation is done to synchronization the receiver's clock and the sender's clock. At 705, timing information is determined using the IP reference time stamp, such as an RTP time stamp and offset information typically extracted from an optional field in the RTP header. Using the timing information at 707, video packet delivery time stamps as well as necessary null packets for the video network can be determined. Delivery time stamps are associated with the time a packet is put onto a video network. At 709, the extracted video packets are multiplexed with video packets from other programs along with null packets needed to preserve timing information on the video network. At 711, video packets are forwarded onto the video network.

The present invention for converting and transmitting video packets and IP packets efficiently can be implemented in various network systems. In some embodiments, the techniques can be implemented on a gateway, router, switch or a headend of high bandwidth networks such as a cable network or a satellite network. In the context of a cable network, the invention is implemented in a standalone system, such as Cisco 6920 RateMux® available from Cisco Systems, Inc, or in a line card of a cable modem headend such as the Cisco UBR 7200 or 7500 also available from Cisco Systems, Inc.

Figure 8:
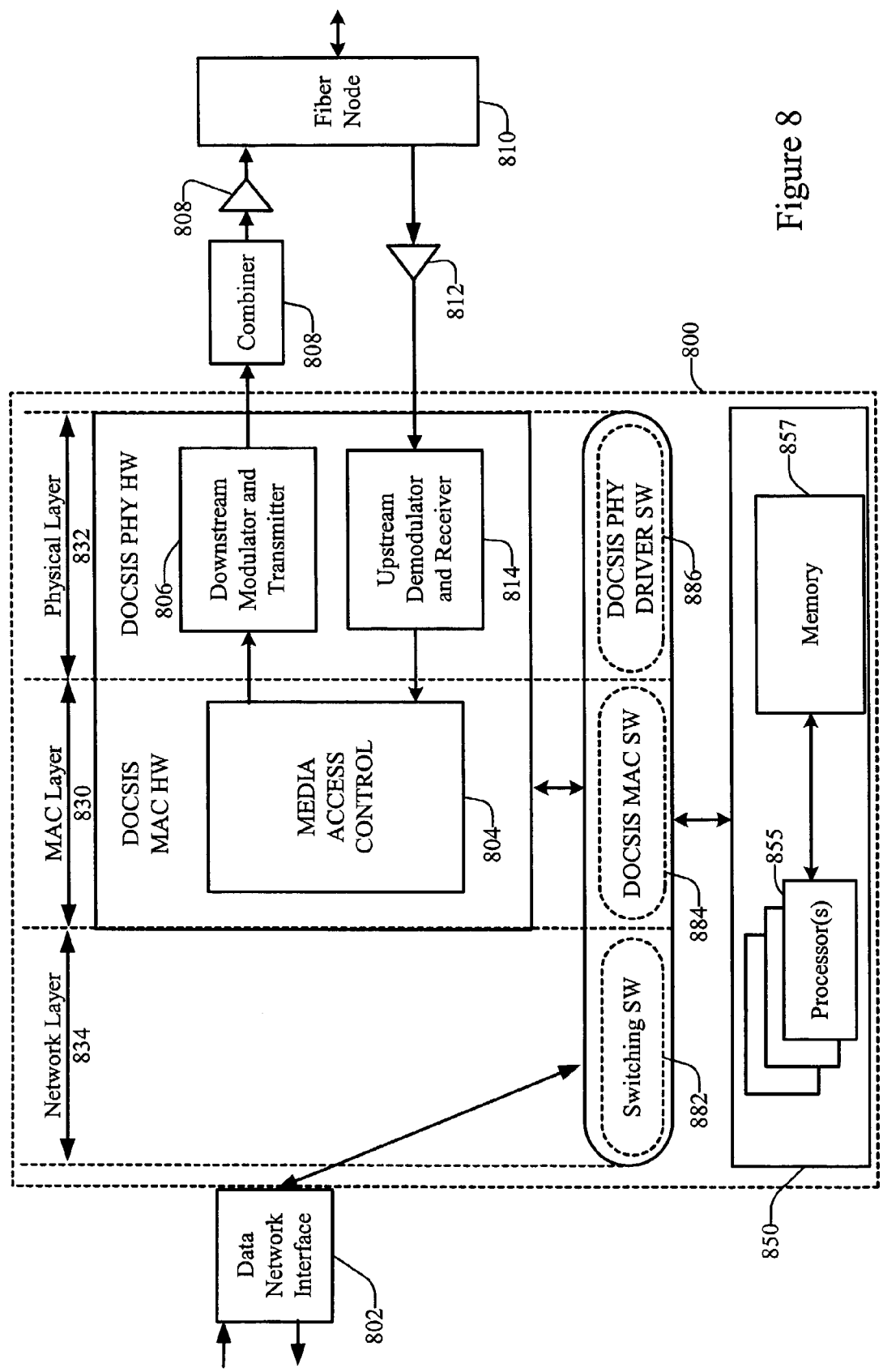
FIG. 8 is a diagrammatic representation showing a router than can be used to implement the techniques of the present invention.

FIG. 8 depicts the basic components of a cable modem headend that can be used to implement the present invention, according to specific embodiments. Although the techniques of the present invention can be integrated into a cable modem headend, the present invention can also be used in a standalone system. FIG. 8 shows an implementation using the cable modem headend.

A Data Network Interface 802 is an interface component between an external data source and the cable system. External data sources transmit data to data network interface 802 via optical fiber, microwave link, satellite link, or through various other media. Also as mentioned above, a Media Access Control Block (MAC Block) 804 receives data packets from a Data Network Interface 802 and encapsulates them with a MAC header.

In a specific embodiment as shown in FIG. 8, CMTS provides functions on three network layers including a physical layer 832, a Media Access Control (MAC) layer 830, and a network layer 834. Generally, the physical layer is responsible for receiving and transmitting RF signals on the cable plant. Hardware portions of the physical layer include a downstream modulator and transmitter 806 and an upstream demodulator and receiver 814. The physical layer also includes software 886 for driving the hardware components of the physical layer.

Once an information packet is demodulated by the demodulator/receiver 814, it is then passed to MAC layer 830. A primary purpose of MAC layer 830 is to encapsulate and decapsulate packets within a MAC header, preferably according to the above-mentioned DOCSIS standard for transmission of data or other information.

MAC layer 830 includes a MAC hardware portion 804 and a MAC software portion 884, which function together to encapsulate information packets with the appropriate MAC address of the cable modem(s) on the system. After the upstream information has been processed by MAC layer 830, it is then passed to network layer 834. Network layer 834 includes switching software 882 for causing the upstream information packet to be switched to an appropriate data network interface on data network interface 802.

When a packet is received at the data network interface 802 from an external source, the switching software within network layer 834 passes the packet to MAC layer 830. MAC block 804 transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 807. Converter 808 converts the modulated RF electrical signals to optical signals that can be received and transmitted by a Fiber Node 810 to the cable modem hub.

It is to be noted that alternate embodiments of the CMTS (not shown) may not include network layer 834. In such embodiments, a CMTS device may include only a physical layer and a MAC layer, which are responsible for modifying a packet according to the appropriate standard for transmission of information over a cable modem network. The network layer 834 of these alternate embodiments of CMTS devices may be included, for example, as part of a conventional router for a packet-switched network.

In a specific embodiment, the network layer of the CMTS is configured as a cable line card coupled to a standard router that includes the physical layer 832 and MAC layer 830. The techniques of the present invention including a filter stage and rate control stage shown in FIG. 1 can be implemented on a line card. Using this type of configuration, the CMTS is able to send and/or receive IP packets to and from the data network interface 802 using switching software block 882. The data network interface 802 is an interface component between external data sources and the cable system. The external data sources transmit data to the data network interface 802 via, for example, optical fiber, microwave link, satellite link, or through various media. The data network interface includes hardware and software for interfacing to various networks such as, for example, Ethernet, ATM, frame relay, etc.

As shown in FIG. 8, the CMTS includes a hardware block 850 including one or more processors 855 and memory 857. These hardware components interact with software and other hardware portions of the various layers within the CMTS. Memory 857 may include, for example, I/O memory (e.g. buffers), program memory, shared memory, etc. Hardware block 850 may physically reside with the other CMTS components. In one embodiment, the software entities 882, 884, and 886 are implemented as part of a network operating system running on hardware 850.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and formats and should not be restricted to the ones mentioned above. For example, although the techniques of the present invention for removing null packets used for maintaining timing information are described in the context of transmitting RTP packets on an IP network, the techniques can be applied to a variety of different packets and networks. In one example, the techniques for removing null packets can also be applied to video packets in a video network. Therefore, the scope of the invention should be determined with reference to the appended claims.

What is claimed is:

1. A method for converting video packets into internet protocol (IP) packets, the method comprising:
receiving a plurality of video packets, the plurality of video packets associated with a video transport reference time stamp, the video transport reference time stamp providing timing information relative to a video source clock;
filtering the plurality of video packets to select a subset of the video packets; combining the subset of video packets into an IP packet having an IP reference time stamp corresponding to the video transport reference time stamp;
determining offset information for multiple video packets in the subset of video packets;
incorporating the offset information into the IP packet; and
transmitting the IP packet.

2. The method of claim 1, wherein video packets are MPEG transport packets (TS).

3. The method of claim 1, wherein the offset information is incorporated into optional fields of the IP packet.

4. The method of claim 1, wherein the offset information is incorporated into the payload of the IP packet.

5. The method of claim 1, wherein filtering comprises selecting video packets of a particular program.

6. The method of claim 1, wherein filtering comprises removing null video packets.

7. The method of claim 1, wherein the video packets are transmitted at a variable bit rate (VBR).

8. The method of claim 1, wherein the IP packet is transmitted at a variable bit rate (VBR).

9. The method of claim 1, wherein the MPEG frame relative time stamp is a decoding time stamp (DTS) associated with an I-frame.

10. The method of claim 1, wherein the video relative time stamp is synchronized to the IP reference time stamp.

11. The method of claim 1, wherein the plurality of video packets include a plurality of null packets.

12. The method of claim 1, wherein approximately six video packets are converted into a single IP packet.

13. A gateway coupling a video network to an IP network, the gateway comprising:
a video network interface configured to receive video packets, the video packets associated with a video transport reference time stamp, the video transport reference time stamp providing timing information relative to a video source clock associated with the sender of the video packets;
a processor configured to filter the video packets to select a subset of the video packets and combine the subset of video packets into an IP packet having an IP reference time stamp corresponding to the video transport reference time stamp, the processor further configured to determine offset information for multiple video packets in the subset of video packets;
an IP network interface configured to transmit the IP packet along with the offset information onto the IP network.

14. The gateway of claim 13, wherein video packets are MPEG transport packets (TS).

15. The gateway of claim 13, wherein the offset information is incorporated into optional fields of the IP packet.

16. The gateway of claim 13, wherein the offset information is incorporated into the payload of the IP packet.

17. The gateway of claim 13, wherein filtering comprises selecting video packets of a particular program.

18. The gateway of claim 13, wherein filtering comprises removing null video packets.

19. The gateway of claim 13, wherein the video packets are transmitted at a variable bit rate (VBR).

20. The gateway of claim 13, wherein the IP packet is transmitted at a variable bit rate (VBR).

21. The gateway of claim 13, wherein the MPEG frame relative time stamp is a decoding time stamp (DTS) associated with an I-frame.

22. The gateway of claim 13, wherein the video relative time stamp is synchronized to the IP reference time stamp.

23. The gateway of claim 13, wherein the plurality of video packets include a plurality of null packets.

24. The gateway of claim 13, wherein approximately six video packets are converted into a single IP packet.

25. A network device for converting video packets into internet protocol (IP) packets, the network device comprising:
- means for receiving a plurality of video packets, the plurality of video packets associated with a video transport reference time stamp, the video transport reference time stamp providing timing information relative to a video source clock;
- means for filtering the plurality of video packets to select a subset of the video packets;
- means for combining the subset of video packets into an IP packet having an IP reference time stamp corresponding to the video transport reference time stamp;
- means for determining offset information for multiple video packets in the subset of video packets; and
- means for incorporating the offset information into the IP packet.

26. The network device of claim 25, wherein video packets are MPEG transport packets (TS).

27. The network device of claim 25, wherein the offset information is incorporated into optional fields of the IP packet.

28. The network device of claim 25, wherein the offset information is incorporated into the payload of the IP packet.

29. A computer readable storage medium encoded therein with a computer executable program for converting video packets into internet protocol (IP) packets, the computer executable program comprising instructions for:
- receiving a plurality of video packets, the plurality of video packets associated with a video transport reference time stamp, the video transport reference time stamp providing timing information relative to a video source clock;
- filtering the plurality of video packets to select a subset of the video packets;
- combining the subset of video packets into an IP packet having an IP reference time stamp corresponding to the video transport reference time stamp;
- determining offset information for multiple video packets in the subset of video packets; and
- sending the offset information onto the IP network.

* * * * *